United States Patent
Saleme et al.

(10) Patent No.: US 9,928,085 B2
(45) Date of Patent: Mar. 27, 2018

(54) STACK-BASED ADAPTIVE LOCALIZATION AND INTERNATIONALIZATION OF APPLICATIONS

(71) Applicant: INTUIT INC., Mountain View, CA (US)

(72) Inventors: Lance Saleme, Santa Clara, CA (US); Benjamin Y. Lee, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 168 days.

(21) Appl. No.: 14/073,648

(22) Filed: Nov. 6, 2013

(65) Prior Publication Data
US 2014/0129209 A1 May 8, 2014

Related U.S. Application Data

(60) Provisional application No. 61/722,879, filed on Nov. 6, 2012.

(51) Int. Cl.
*G06F 17/20* (2006.01)
*G06F 17/28* (2006.01)
*G06F 9/44* (2018.01)
*G06F 17/21* (2006.01)

(52) U.S. Cl.
CPC ............ *G06F 9/4448* (2013.01); *G06F 17/20* (2013.01); *G06F 17/211* (2013.01); *G06F 17/28* (2013.01); *G06F 17/289* (2013.01)

(58) Field of Classification Search
CPC combination set(s) only.
See application file for complete search history.

(56) References Cited

U.S. PATENT DOCUMENTS

| 5,721,848 A | * | 2/1998 | Joseph | G06F 9/4443 715/764 |
| 5,819,249 A | * | 10/1998 | Dohanich | G06N 5/022 706/46 |
| 5,868,576 A | * | 2/1999 | Maruta | G06F 17/271 434/118 |

(Continued)

FOREIGN PATENT DOCUMENTS

WO  2006026636 A2  3/2006

OTHER PUBLICATIONS

Sharma et al., "Method and System for Creating Tax Configuration Templates," U.S. Appl. No. 13/655,313, filed Oct. 18, 2012.

(Continued)

*Primary Examiner* — Fariba Sirjani
*Assistant Examiner* — David Kovacek
(74) *Attorney, Agent, or Firm* — Patterson + Sheridan, LLP (57) ABSTRACT

The disclosed embodiments provide a system that facilitates use of an application. During operation, the system obtains a language stack containing an ordered set of preferred languages for a user of the application. Next, for each user-interface component from a set of user-interface components in the application, the system obtains content for the user-interface component based on an order of languages in the language stack. The system then includes the content in the user-interface component during use of the application on an electronic device by the user.

16 Claims, 5 Drawing Sheets

(56) References Cited

U.S. PATENT DOCUMENTS

| | | | |
|---|---|---|---|
| 5,917,484 A * | 6/1999 | Mullaney | G06F 17/27 704/8 |
| 6,018,730 A | 1/2000 | Nichols et al. | |
| 6,065,026 A * | 5/2000 | Cornelia | G06F 17/24 715/202 |
| 6,138,086 A * | 10/2000 | Rose | G06F 17/2205 704/8 |
| 6,202,052 B1 | 3/2001 | Miller | |
| 6,205,418 B1 * | 3/2001 | Li | G06F 17/289 704/8 |
| 6,253,193 B1 | 6/2001 | Ginter et al. | |
| 6,339,755 B1 * | 1/2002 | Hetherington | G06F 17/21 704/8 |
| 6,623,529 B1 * | 9/2003 | Lakritz | G06F 17/2288 707/E17.109 |
| 7,110,952 B2 * | 9/2006 | Kursh | 704/270.1 |
| 7,225,199 B1 * | 5/2007 | Green et al. | |
| 7,249,072 B1 * | 7/2007 | Nearhood | G06Q 10/10 705/31 |
| 7,249,344 B1 * | 7/2007 | Zeanah | G06Q 20/32 705/35 |
| 7,257,775 B1 * | 8/2007 | Jivakov | G06F 9/4443 715/742 |
| 7,603,301 B1 | 10/2009 | Regan | |
| 7,636,742 B1 | 12/2009 | Olavarrieta et al. | |
| 7,693,760 B1 | 4/2010 | Fiteni et al. | |
| 7,761,484 B2 | 7/2010 | Christensen et al. | |
| 7,814,470 B2 | 10/2010 | Mamou et al. | |
| 7,823,125 B2 * | 10/2010 | Batabyal | G06F 8/36 717/102 |
| 7,860,763 B1 | 12/2010 | Quinn et al. | |
| 7,904,595 B2 | 3/2011 | Cheng et al. | |
| 7,930,167 B2 | 4/2011 | Young et al. | |
| 7,970,796 B1 | 6/2011 | Narayanan | |
| 8,082,193 B2 | 12/2011 | Seeley et al. | |
| 8,209,229 B1 | 6/2012 | Weiss et al. | |
| 8,296,720 B2 | 10/2012 | Coulthard et al. | |
| 8,346,537 B2 * | 1/2013 | Chino | G06F 9/4443 246/5 |
| 8,402,047 B1 | 3/2013 | Mangini et al. | |
| 8,438,006 B2 | 5/2013 | Yang et al. | |
| 8,447,873 B1 * | 5/2013 | Joyce | G06F 9/54 709/203 |
| 8,452,676 B1 | 5/2013 | Talan et al. | |
| 8,527,307 B2 | 9/2013 | Hamilton et al. | |
| 8,595,710 B2 | 11/2013 | Aldahleh et al. | |
| 8,650,476 B1 * | 2/2014 | Belle | G06F 17/241 705/26.35 |
| 8,788,259 B1 * | 7/2014 | Buryak | G06F 9/4448 704/8 |
| 2001/0029455 A1 * | 10/2001 | Chin | G06F 17/273 704/277 |
| 2001/0042080 A1 | 11/2001 | Ross | |
| 2002/0064766 A1 * | 5/2002 | Cozens | G09B 5/02 434/350 |
| 2002/0120762 A1 * | 8/2002 | Cheng | G06F 17/3089 709/230 |
| 2002/0177993 A1 * | 11/2002 | Veditz | G06F 17/2205 704/8 |
| 2002/0184308 A1 * | 12/2002 | Levy | G06F 9/4448 709/203 |
| 2003/0009323 A1 * | 1/2003 | Adeli | G06F 9/4448 704/8 |
| 2003/0040899 A1 * | 2/2003 | Ogilvie | 704/2 |
| 2003/0050936 A1 * | 3/2003 | Wainwright | G06Q 10/087 |
| 2003/0058272 A1 * | 3/2003 | Maeno | G06F 17/218 715/738 |
| 2003/0084401 A1 * | 5/2003 | Abel | G06F 17/30867 715/205 |
| 2003/0088617 A1 * | 5/2003 | Clark | G06F 9/465 709/203 |
| 2004/0019540 A1 * | 1/2004 | William | G06Q 10/10 705/31 |
| 2004/0019541 A1 * | 1/2004 | William | G06Q 10/10 705/31 |
| 2004/0046789 A1 * | 3/2004 | Inanoria | G06F 8/38 715/748 |
| 2004/0059998 A1 * | 3/2004 | Palmieri | G06F 17/2863 715/265 |
| 2004/0085570 A1 * | 5/2004 | Sfaelos | G06F 9/4448 358/1.15 |
| 2004/0167768 A1 * | 8/2004 | Travieso et al. | 704/2 |
| 2005/0099398 A1 * | 5/2005 | Garside | G06F 17/242 345/173 |
| 2005/0102283 A1 | 5/2005 | Anderson et al. | |
| 2005/0177358 A1 * | 8/2005 | Melomed et al. | 704/2 |
| 2005/0197786 A1 * | 9/2005 | Kataria | G06F 19/326 702/19 |
| 2005/0203727 A1 * | 9/2005 | Heiner | H04W 4/02 704/2 |
| 2006/0080082 A1 * | 4/2006 | Ravindra | G06F 17/289 704/8 |
| 2006/0100858 A1 * | 5/2006 | McEntee | G06F 17/2247 704/10 |
| 2006/0117304 A1 | 6/2006 | Anastassopoulos et al. | |
| 2006/0155618 A1 | 7/2006 | Wyle | |
| 2006/0206310 A1 * | 9/2006 | Ravikumar et al. | 704/9 |
| 2007/0021982 A1 | 1/2007 | Sun | |
| 2007/0041370 A1 * | 2/2007 | Cleveland | 370/352 |
| 2007/0192715 A1 * | 8/2007 | Kataria | G06Q 10/06 715/764 |
| 2008/0096486 A1 * | 4/2008 | Whitten | G06F 21/608 455/66.1 |
| 2009/0094609 A1 | 4/2009 | Burukhin et al. | |
| 2009/0138255 A1 * | 5/2009 | Sterling | G06Q 20/10 704/2 |
| 2009/0327002 A1 * | 12/2009 | Chapman | G06Q 10/06 705/7.27 |
| 2010/0017251 A1 * | 1/2010 | Rawle | G06Q 10/063 705/7.11 |
| 2010/0042518 A1 | 2/2010 | Handa et al. | |
| 2010/0045460 A1 * | 2/2010 | Caler et al. | 340/541 |
| 2010/0058169 A1 | 3/2010 | Demant et al. | |
| 2010/0063877 A1 * | 3/2010 | Soroca | G06F 17/30749 705/14.45 |
| 2010/0198579 A1 * | 8/2010 | Cunnington et al. | 704/3 |
| 2011/0004897 A1 * | 1/2011 | Alexander | H04N 7/17336 725/32 |
| 2011/0016375 A1 * | 1/2011 | Ramic | G06F 17/241 715/205 |
| 2011/0046939 A1 * | 2/2011 | Balasaygun | G06F 9/543 704/2 |
| 2011/0191246 A1 | 8/2011 | Brandstetter et al. | |
| 2011/0192895 A1 * | 8/2011 | Millan Marco | G06F 17/289 235/375 |
| 2011/0197285 A1 | 8/2011 | Ginter et al. | |
| 2011/0214067 A1 * | 9/2011 | Tanaka | G06F 17/243 715/745 |
| 2011/0264440 A1 * | 10/2011 | Zhou | G06F 17/2288 704/8 |
| 2011/0264569 A1 | 10/2011 | Houseworth et al. | |
| 2012/0017146 A1 * | 1/2012 | Travieso et al. | 715/265 |
| 2012/0035908 A1 * | 2/2012 | Lebeau | G06F 17/28 704/2 |
| 2012/0036078 A1 | 2/2012 | Dean et al. | |
| 2012/0060112 A1 | 3/2012 | Wilson et al. | |
| 2012/0191580 A1 | 7/2012 | Bhatt | |
| 2012/0239381 A1 | 9/2012 | Heidasch | |
| 2012/0278213 A1 | 11/2012 | Bristow et al. | |
| 2012/0330721 A1 | 12/2012 | Volpe et al. | |
| 2013/0013286 A1 * | 1/2013 | Rodet | G06F 9/4448 704/3 |
| 2013/0124185 A1 * | 5/2013 | Sarr et al. | 704/2 |
| 2013/0124187 A1 * | 5/2013 | Qin | G06F 3/01 704/8 |
| 2013/0151233 A1 * | 6/2013 | Gande | G06F 17/20 704/8 |
| 2013/0191108 A1 * | 7/2013 | Anisimovich et al. | 704/4 |
| 2013/0226554 A1 * | 8/2013 | Dillard | G06F 17/289 704/2 |

(56) References Cited

U.S. PATENT DOCUMENTS

| | | | |
|---|---|---|---|
| 2013/0282365 A1* | 10/2013 | Van De Ven | G06F 17/274 704/9 |
| 2014/0006004 A1* | 1/2014 | Gundepuneni et al. | 704/2 |
| 2014/0006929 A1* | 1/2014 | Swartz | G06F 3/0237 715/234 |
| 2014/0052434 A1* | 2/2014 | Bank | G06F 17/289 704/2 |
| 2014/0129209 A1* | 5/2014 | Saleme et al. | 704/8 |
| 2015/0161114 A1* | 6/2015 | Buryak | G06F 9/4448 704/8 |
| 2015/0161227 A1* | 6/2015 | Buryak | G06F 9/4448 707/738 |

OTHER PUBLICATIONS

Goyette et al., "A Content Based Payroll Compliance System," U.S. Appl. No. 13/906,202, filed May 30, 2013.

Naik et al., "Method and System for Providing a Payroll Preparation Platform with User Contribution-Based Plug-Ins," U.S. Appl. No. 13/906,202, filed May 30, 2013.

Intuit "TurboTax/MacInTax for Business Streamlines Tax Preparation for Small Business Owners," Intuit Press Release, Jan. 6, 1999, 2 pages. http://web.intuit.com/about_intuit/press_releases/1999/01-06_1.html.

* cited by examiner

STACK-BASED ADAPTIVE LOCALIZATION AND INTERNATIONALIZATION OF APPLICATIONS

RELATED APPLICATION

This application claims priority under 35 U.S.C. § 119 to U.S. Provisional Application No. 61/722,879, entitled "Dynamically Adaptive Localization Given the Preferred Device Language & Locale and the Country of the User-Selected Company to Determine the Display Language, Tax Model, Currency, and Data Formatting," by Lance Saleme and Benjamin Lee, filed 6 Nov. 2012, the contents of which are herein incorporated by reference in their entirety.

BACKGROUND

Related Art

The disclosed embodiments relate to internationalization and localization. More specifically, the disclosed embodiments relate to techniques for stack-based adaptive localization and internationalization of applications.

Applications may be adapted to the languages, regions, and/or technical requirements of multiple markets using localization and/or internationalization. In localization, strings may be translated and application resources may be managed for multiple languages. With internationalization, applications may be designed, organized, and/or implemented to adapt the applications to different languages, regions, and/or data models without engineering changes.

However, conventional techniques for localization and/or internationalization may be difficult to scale across a large number of languages, locales, and/or technical requirements. For example, a financial-management application may support 100 languages and be deployed in 50 different countries, each with a different set of accounting and/or tax rules. If each set of accounting and/or tax rules is associated with an average of 50 user-interface components, the application may require 2500 different user-interface components, each with 100 different translations and/or other language-specific content. In turn, the significant size and complexity of the application may negatively impact the use of resources by the application and/or result in significant overhead during updating and/or maintenance of the application.

Consequently, the development, management, execution, and maintenance of applications may be facilitated by mechanisms for scaling the applications across languages, locales, and/or technical requirements.

SUMMARY

The disclosed embodiments provide a system that facilitates use of an application. During operation, the system obtains a language stack containing an ordered set of preferred languages for a user of the application. Next, for each user-interface component from a set of user-interface components in the application, the system obtains content for the user-interface component based on an order of languages in the language stack. The system then includes the content in the user-interface component during use of the application on an electronic device by the user.

In some embodiments, the system also obtains the set of user-interface components based on a globalization setting for the application.

In some embodiments, obtaining the set of user-interface components based on the globalization setting involves obtaining a business-logic stack of one or more sets of business rules associated with the globalization setting, and including the user-interface component in the set of user-interface components based on an order of the one or more sets of business rules in the business-logic stack.

In some embodiments, including the user-interface component in the set of user-interface components based on the order of the one or more sets of business rules in the business-logic stack involves:
   (i) attempting to obtain a first variant of the user-interface component associated with a first set of business rules in the business-logic stack;
   (ii) if the first variant is available, including the first variant in the set of user-interface components; and
   (iii) if the first variant is not available, attempting to obtain a second variant of the user-interface component associated with a second set of business rules following the first set of business rules in the business-logic stack.

In some embodiments, the globalization setting is associated with at least one of a locale, an organization, and a category.

In some embodiments, obtaining the language stack of preferred languages for the user involves including a default language at a bottom of the language stack, and adding one or more languages to the language stack based on at least one of a locale setting associated with the electronic device and the globalization setting.

In some embodiments, obtaining content for the user-interface component based on the order of languages in the language stack involves:
   (i) attempting to obtain content for the user-interface component in a first language in the ordered set;
   (ii) if the content is available in the first language, using the content with the user-interface component; and
   (iii) if the content is not available in the first language, attempting to obtain the content in a second language following the first language in the ordered set.

In some embodiments, the user-interface component includes at least one of a string, a graphical object, a display setting, and a file.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating use of an application. More specifically, the disclosed embodiments provide a method and system for performing stack-based adaptive localization and internationalization of the application.

Figure 1:
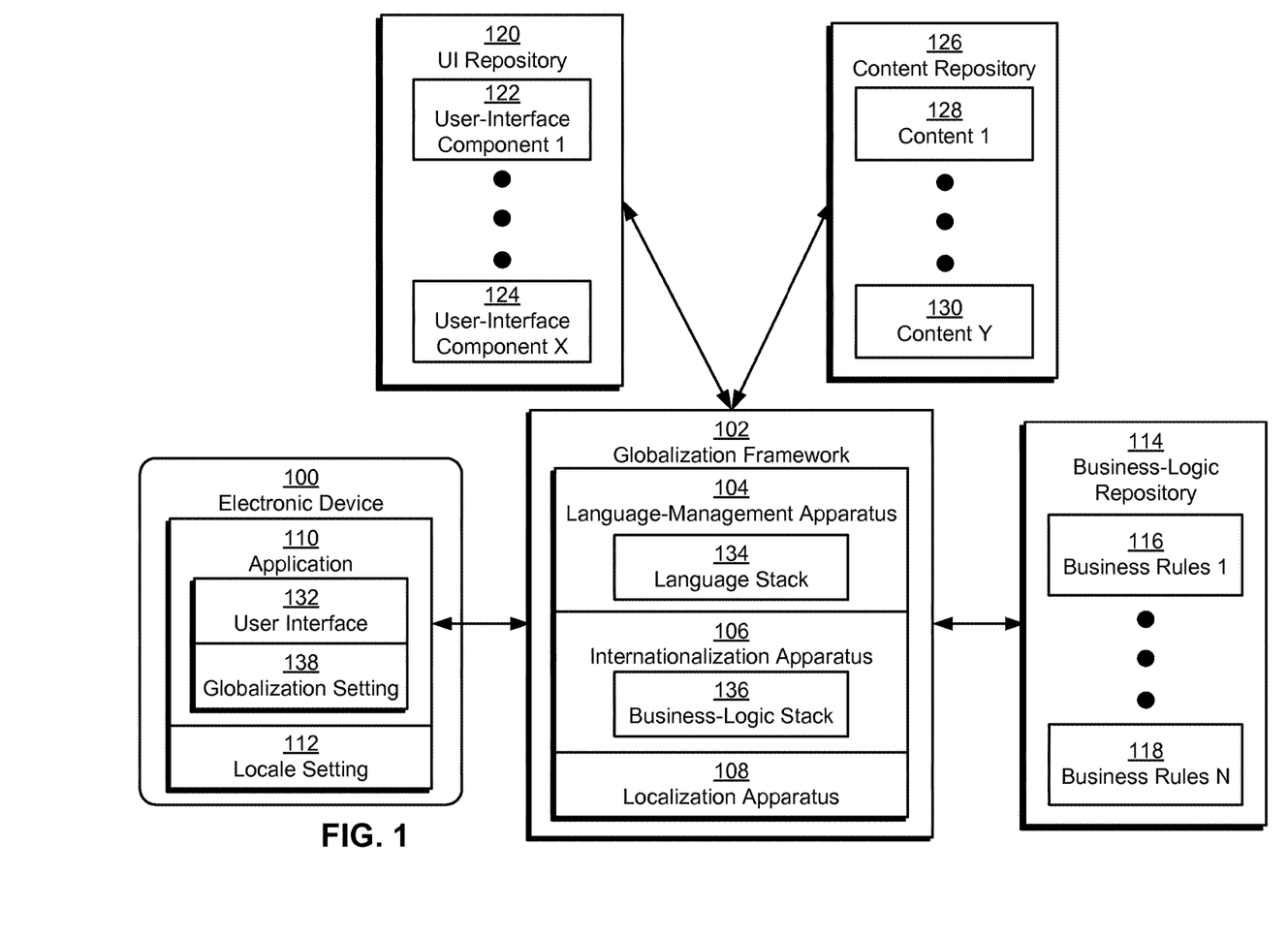
FIG. 1 shows a schematic of a system in accordance with the disclosed embodiments.

As shown in FIG. 1, an application 110 may execute on an electronic device 100 such as a mobile phone, tablet computer, laptop computer, personal computer, personal digital assistant, and/or portable media player. For example, application 110 may be downloaded from an application distribution system and/or content provider and installed locally on electronic device 100. As a result, the implementation of application 110 may be based on the platform (e.g., operating system, hardware, etc.) of electronic device 100.

Application 110 may then be used to perform a set of tasks for a user of electronic device 100. For example, application 110 may allow the user to browse websites, send and receive emails, create and edit documents, access and/or organize digital media, play a game, use mapping and/or navigation services, and/or manage finances on portable electronic device 100.

During use of application 110, electronic device 100 may use a network connection to obtain data associated with application 110 from a server and transmit updates to the data to the server. For example, electronic device 100 may use a wireless and/or cellular network to send and receive emails, financial information, digital media, documents, game play information, and/or other data used by application 110 with the server. As a result, application 110 may execute using a client-server model.

In addition, interaction between the user and application 110 may be enabled by a user interface 132. For example, user interface 132 may be a graphical user interface (GUI) that displays text, images, documents, menus, icons, thumbnails, form fields, data, and/or other user-interface components (e.g., user-interface component 1 122, user-interface component x 124) to the user. The GUI may also accept user input (e.g., gestures, keyboard presses, etc.) that is used to manipulate and/or update the user-interface components. In other words, user interface 132 may be a mechanism for providing and/or formatting data and/or features associated with application 110 for use on electronic device 100.

Those skilled in the art will appreciate that user-interface components in user interface 132 may be adapted to the language, region, and/or technical requirements of the user and/or electronic device 100. For example, localization of application 110 may be performed to manage and/or translate resources in application 110 for use with multiple languages. Moreover, internationalization of application 110 may enable the adaptation of application 110 to different languages, regions, and/or data models without requiring engineering changes to application 110.

On the other hand, conventional techniques for performing localization and internationalization, including support for localization and/or internationalization on the platform of electronic device 100, may not scale across large numbers of languages, technical requirements, and/or locales. For example, application 110 may have a different set of business rules (e.g., business rules 1 116, business rules n 118) for each of 50 countries in which application 110 is deployed. Application 110 may also be translated into 100 different languages and/or dialects. If each country-specific implementation of application 110 has 50 user-interface components, a user-interface repository 120 for the whole application 110 may have 2500 different user-interface components. Moreover, a content repository 126 containing language-specific content (e.g., content 1 128, content y 130) for the user-interface components may have 250,000 different strings, graphical objects, display settings, and/or files for inclusion in the user-interface components. The large amount and/or complexity of user-interface components and content may negatively impact the installation, execution, maintenance, and/or update of application 110.

In one or more embodiments, the system of FIG. 1 includes functionality to perform localization and internationalization of application 110 in a way that decouples the language and/or locale of the user from the language and/or locale associated with application 110 and/or business rules used by application 110. In addition, the system may dynamically and/or adaptively update content in user-interface components of application 110 based on changes to a locale setting 112 associated with electronic device 100 or the business rules and the availability of language-specific content for use with the user-interface components.

In particular, a globalization framework 102 for application 110 may combine user-interface components and content for the user-interface components in application 110 based on locale setting 112 for electronic device 100, a globalization setting 138 for application 110, a language stack 134 of preferred languages, and a business-logic stack 136 of sets of business rules. Globalization framework 102 includes a language-management apparatus 104, an internationalization apparatus 106, and a localization apparatus 108. Each of the components of globalization framework 102 is discussed in further detail below.

Locale setting 112 may correspond to a language, region, and/or other attributes associated with variants of user-interface components in application 110 and/or electronic device 100. Locale setting 112 may be set by the user during activation and/or configuration of electronic device 100.

Electronic device 100 may then use locale setting 112 to provide text, images, audio, video, color schemes, files and/or other content specific to locale setting 112 to the user.

On the other hand, globalization setting 138 may be specific to application 110 and relate to a locale, an organization, and/or a category associated with business rules and/or business logic of application 110. For example, globalization setting 138 may include the country in which the user and/or an organization associated with the user (e.g., the user's company) are located. In turn, globalization setting 138 may be used to select one or more sets of business rules (e.g., business rules 1 116, business rules n 118) from a business-logic repository 114 for performing country-specific tasks such as managing finances and/or filing taxes. In another example, globalization setting 138 may include demographic information, such as age, height, weight, gender, and/or ethnicity. Application 110 and/or globalization framework 102 may use the demographic information to select an appropriate set of business rules for tracking and/or managing the user's health.

As shown in FIG. 1, language stack 134 may be provided by language-management apparatus 104. Language-management apparatus 104 may create language stack 134 as an ordered set of preferred languages for the user of application 110 and/or electronic device 100. During the creation of language stack 134, language-management apparatus 104 may include a default language at the bottom of language stack 134. For example, language-management apparatus 104 may add a default and/or mandatory language in which content for user-interface components of application 110 must be available to the bottom of language stack 134.

Next, language-management apparatus 104 may add one or more languages to language stack 134 based on locale setting 112 and/or globalization setting 138. Continuing with the above example, language-management apparatus 104 may add a language associated with globalization setting 138 to language stack 134 above the default language, and a language associated with locale setting 112 to language stack 134 above the language associated with globalization setting 138. If the languages associated with locale setting 112 and/or globalization setting 138 are region-specific, language-management apparatus 104 may also include generic versions of the languages in language stack 134. Unlike the default language, other languages in language stack 134 do not have to have content for all user-interface components of application 110.

Language stack 134 may then be used by localization apparatus 108 to select content for inclusion in user-interface components of application 110. More specifically, localization apparatus 108 may obtain content for each user-interface component in application 110 based on the order of languages in language stack 134, starting with the topmost language. For example, language stack 134 may include the following languages, from top to bottom: French-Canada, French-Generic, Spanish-Generic, English. As a result, localization apparatus 108 may attempt to obtain content for the user-interface component in Canadian French, then generic French, then generic Spanish, then English. In other words, localization apparatus 108 may obtain content for the user-interface component as available content in content repository 126 that is associated with a language that is as close to the top of language stack 134 as possible. If no content is available for the top three languages in language stack 134, localization apparatus 108 may use content from the default language (e.g., English) at the bottom of language stack 134, since such content is required to be available.

After the content is obtained, localization apparatus 108 may include the content in the user-interface component during use of application 110 by the user. For example, localization apparatus 108 may insert and/or "inject" the content into the user-interface component during runtime of application 110. In addition, changes to the language associated with locale setting 112 and/or globalization setting 138 may be dynamically reflected in application 110 by language-management apparatus 104 and/or localization apparatus 108. For example, a change in language from English to German in locale setting 112 may result in the display of German strings and/or content in application 110 without requiring restarting and/or reinstallation of application 110 on electronic device 100.

Unlike language stack 134, business-logic stack 136 may be created by internationalization apparatus 106 as an ordered list of one or more sets of business rules, with the highest-priority set of business rules placed at the top of business-logic stack 136 and the lowest-priority set of business rules placed at the bottom of business-logic stack 136. In addition, business-logic stack 136 may be populated with sets of business rules based on globalization setting 138. For example, globalization setting 138 for a financial-management application 110 may include a city, state, and country. Globalization setting 138 may be used to retrieve a tax model containing local, state, and federal tax codes for the city, state, and country, respectively. Business rules corresponding to the federal, state, and local tax codes may then be added to business-logic stack 136 in ascending order of priority (e.g., from bottom to top).

After business-logic stack 136 is created, internationalization apparatus 106 may select user-interface components for use in application 110 based on the order of business rules in business-logic stack 136. Continuing with the above example, a user-interface component for calculating sales tax may be obtained by attempting to find a variant of the user-interface component associated with the local tax code, then the state tax code, and finally, the federal tax code. Each variant may be customized according to the corresponding set of business rules. As a result, the variant may be more relevant to use of application 110 by the user than a generic and/or basic version of the user-interface component.

Consequently, internationalization apparatus 106 may obtain a user-interface component for use in application 110 as an available variant of the user-interface component associated with the set of business rules that is as close to the top of business-logic stack 136 as possible. Alternatively, if no variants are available with any of the sets of business rules in business-logic stack 136, internationalization apparatus 106 may obtain a basic version of the user-interface component for use in application 110. Selection of user-interface components and content for user-interface components of applications is described in further detail below with respect to FIG. 2.

By decoupling user-interface components from languages and business rules, the system of FIG. 1 may minimize the size, resource duplication, and/or customization of application 110. In addition, the use of language stack 134 and business-logic stack 136 in selecting content and user-interface components for inclusion in user interface 132 may increase the relevance and/or usability of application 110 to the user while providing fallback options for content that is not currently localized and/or internationalized to locale setting 112 and/or globalization setting 138.

Finally, the system of FIG. 1 may provide adaptive localization and internationalization of application 110 using mechanisms for configuring application 110 that are supported by the platform of electronic device 100. For example, globalization framework 102 may utilize a directory hierarchy, interface builder, and/or localization mechanism associated with the platform of electronic device 100 to create and store user-interface components and content for the user-interface components. Globalization framework 102 may then use language stack 134 and business-logic stack 136 to increase the flexibility of localizing and/or internationalizing application 110 while reducing the size and/or complexity of application 110.

Those skilled in the art will appreciate that the system of FIG. 1 may be implemented in a variety of ways. First, language-management apparatus 104, internationalization apparatus 106, localization apparatus 108, business-logic repository 114, user-interface repository 120, and content repository 126 may be provided by a single physical machine, multiple computer systems, a grid, one or more databases, one or more filesystems, and/or a cloud computing system. In addition, language-management apparatus 104, internationalization apparatus 106, and/or localization apparatus 108 may be provided by the same hardware and/or software component or execute independently from one another. For example, language-management apparatus 104, internationalization apparatus 106, and/or localization apparatus 108 may execute within application 110 on electronic device 100. Conversely, language-management apparatus 104, internationalization apparatus 106, and/or localization apparatus 108 may execute on a server that is capable of communicating with electronic device 100 and providing localization and internationalization to application 110 executing on electronic device 100.

Second, language stack 134 and business-logic stack 136 may be created using a number of techniques. For example, globalization framework 102 may prioritize languages in language stack 134 and/or sets of business rules in business-logic stack 136 based on ordered lists provided by the user, the user's current and/or previous locations, and/or the user's use of other languages with other features (e.g., phone calls, email, etc.) and/or applications on electronic device 100.

Figure 2:
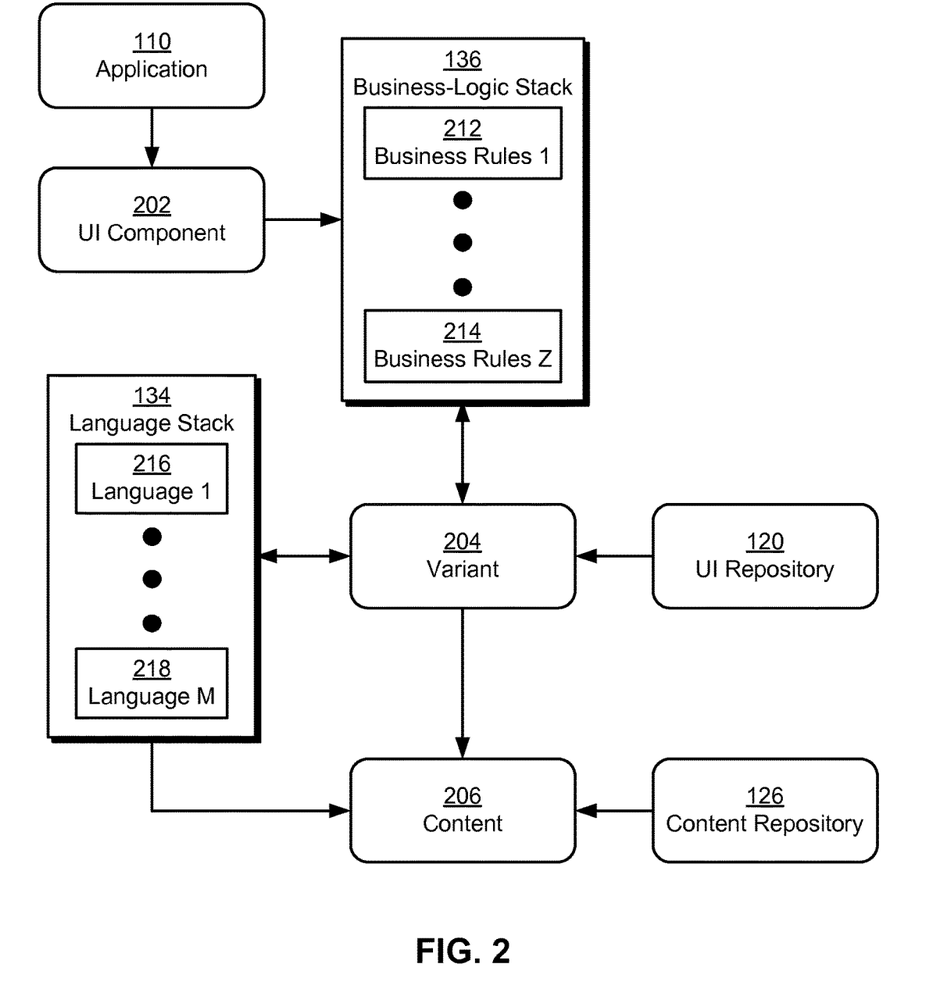
FIG. 2 shows the selection of content for a user-interface component in an application in accordance with the disclosed embodiments.

FIG. 2 shows the selection of content 206 for a user-interface component 202 in application 110 in accordance with the disclosed embodiments. As mentioned above, user-interface component 202 may include a string, a graphical object, a display setting, and/or a file. In addition, a variant 204 of user-interface component 202 may be selected for use in application 110 based on business-logic stack 136, which contains an ordered list of one or more sets of business rules (e.g., business rules 1 212, business rules z 214) associated with application 110. For example, variant 204 may be selected as an available variant of user-interface component 202 from user-interface repository 120 that is associated with the highest possible set of business rules in business-logic stack 136.

Variant 204 may also be selected based on language stack 134, which contains an ordered set of preferred languages (e.g., language 1 216, language m 218) for a user of application 110. For example, language stack 134 may be used to refine variant 204 into a custom layout for displaying content 206 in a specific language in user-interface component 202.

In one or more embodiments, variants of user-interface component 202 in user-interface repository 120 may be based on both language and region. For example, user-interface component 202 may include variants that are both language- and region-specific if user-interface component 202 includes a postal address. As a result, address formats for four countries and two language-specific custom layouts may result in the inclusion of eight variants of user-interface component 202 in user-interface repository 120.

After variant 204 is selected, content 206 for user-interface component 202 may be obtained based on the order of languages in language stack 134. For example, content 206 may be selected as available content for user-interface component 202 from content repository 126 that is associated with the highest possible language in language stack 134. Consequently, content 206 may be customized to a particular set of business rules, a specific language, and/or a language-based layout associated with the set of business rules.

The selection of variant 204 and/or content 206 may be illustrated with the following example. Language stack 134 may include the following languages from top to bottom:
1. language from locale setting of electronic device 100;
2. default language from globalization setting of application 110; and
3. English.

Business-logic stack 136 may specify the use of business rules associated with a tax model of a country from the globalization setting. In addition, the language from the locale setting may be set to Spanish, and the globalization setting may include a country of Canada and a language of French-Canada.

User-interface repository 120 may include a basic version of a user-interface component named "LineItemTaxCell," as well as business-rule-specific variants named "LineItemTaxCellTAX," "LineItemTaxCellVAT," and "LineItemTaxCellGST." The basic version and business-rule-specific variants may be placed in a "Resources" folder that represents variants of user-interface components that lack language-specific custom layouts.

User-interface repository 120 may also include a folder for Spanish-specific localizations and customizations, which also includes a variant named "LineItemTaxCellVAT." The folder may also include the following set of strings corresponding to content 206 in Spanish for user-interface component 202, with the string selected for inclusion in user-interface component 202 shown in bold:

```
/* Apply tax amount to line item. */
"LINE.ITEM.LABEL.TAX" = "Aplicar el impuesto:";
/* Apply VAT amount to line item. */
"LINE.ITEM.LABEL.VAT" = "Aplicar el impuesto al valor
   agregado:";
/* Apply GST amount to line item. */
"LINE.ITEM.LABEL.GST" = "Aplicara impuesto sobre bienes y
   servicios:";
```

In other words, the selected string may map to the Spanish-specific variant of "LineItemTaxCellVAT" instead of other, non-language-specific variants from the "Resources" folder.

Alternatively, the language from the locale setting may be Russian, and the globalization setting may have a country of United Kingdom (Great Britain) and a language of English-GB. If the Russian language is not supported by application 110, content 206 for user-interface component 202 may fall back to custom layouts and/or strings for English-GB.

Figure 3:
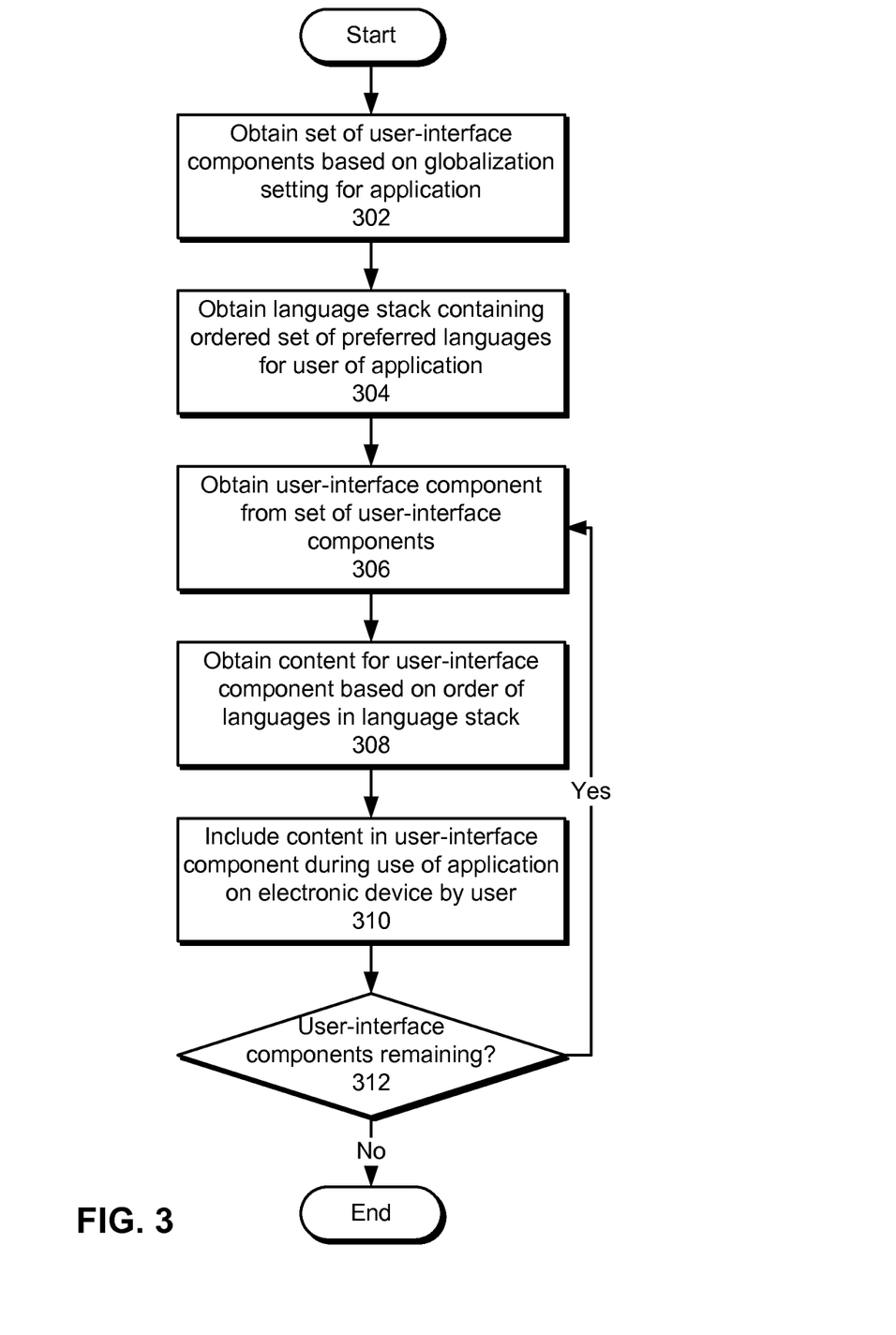
FIG. 3 shows a flowchart illustrating the process of facilitating use of an application in accordance with the disclosed embodiments.

FIG. 3 shows a flowchart illustrating the process of facilitating use of an application in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of user-interface components is obtained based on a globalization setting for the application (operation 302). The globalization setting may be associated with a locale, an organization, and/or a category. In addition, the globalization setting may be associated with a business-logic stack that is used to obtain the user-interface components for use in the application, as described in further detail below with respect to FIG. 4.

Next, a language stack containing an ordered set of preferred languages for a user of the application is obtained (operation 304). The language stack may be created by including a default language at a bottom of the language stack and adding one or more languages to the language stack based on a locale setting associated with the electronic device and/or the globalization setting. Content may be available in the default language for all user-interface components in the application, while content may be available in other languages for some or all user-interface components in the application.

A user-interface component is obtained from the set of user-interface components (operation 306), and content for the user-interface component is obtained based on the order of languages in the language stack (operation 308). In particular, an attempt to obtain content for the user-interface component in a first language in the ordered set may be made. If the content is available in the first language, the content is used with the user-interface component. If the content is not available, an attempt to obtain the content in a second language following the first language in the ordered set is made. Attempts to retrieve available content for the user-interface component may continue until available content in a non-default language in the language stack is found or the default language is reached in the language stack.

The content is then included in the user-interface component during use of the application on an electronic device by the user (operation 310). For example, the content may be "injected" into the user-interface component during display of the user-interface component in the application.

Selection of content may proceed with remaining user-interface components (operation 312) in the set. If content has not been obtained for all user-interface components to be used in the application, the content is obtained for each user-interface component based on the order of languages in the language stack (operations 306-308) and included in the user-interface component during use of the application (operation 310). Such language-based selection and use of content may continue until content has been obtained for all user-interface components to be used in the application.

Figure 4:
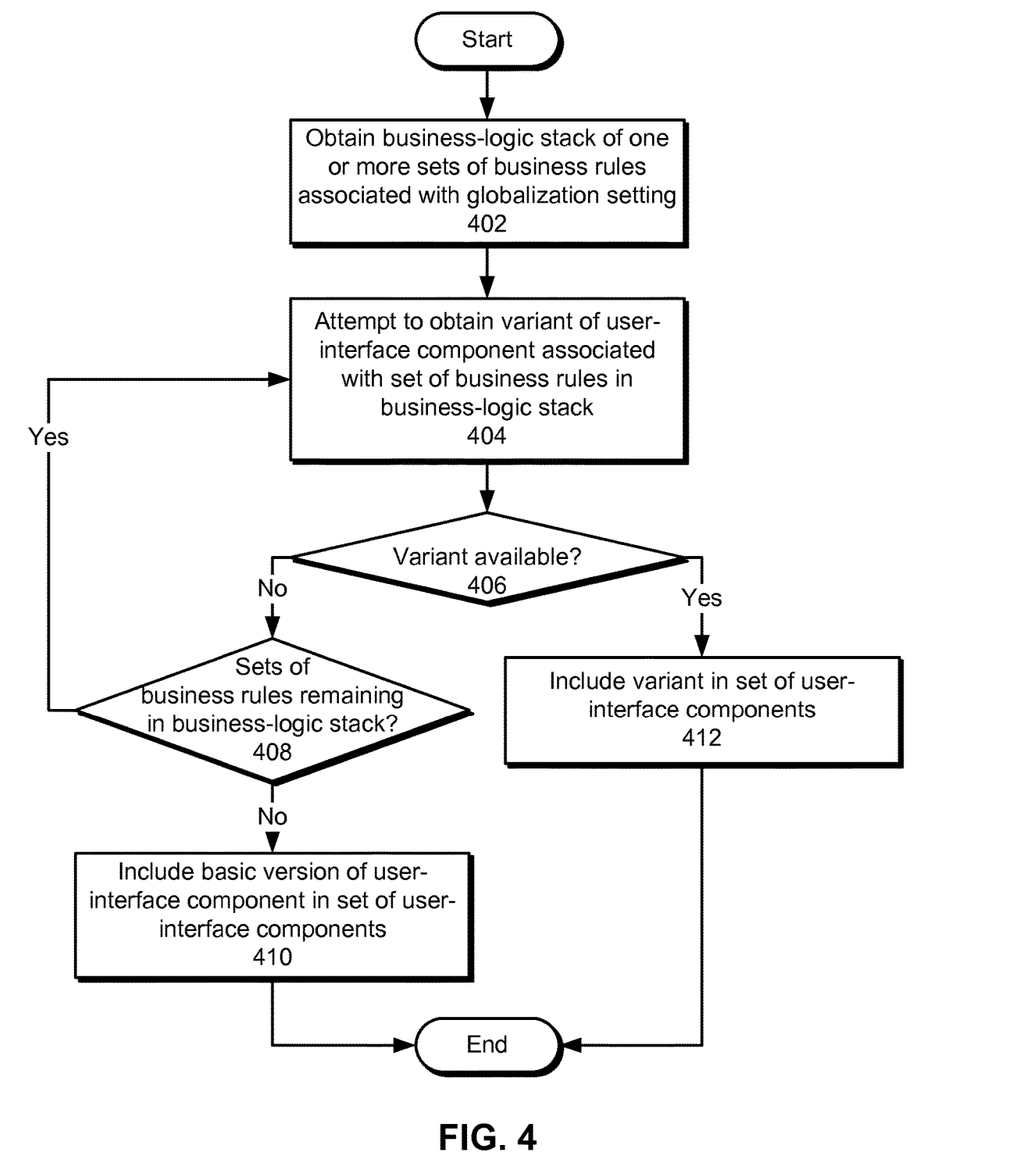
FIG. 4 shows a flowchart illustrating the process of obtaining a user-interface component based on a globalization setting for an application in accordance with the disclosed embodiments.

FIG. 4 shows a flowchart illustrating the process of obtaining a user-interface component based on a globalization setting for an application in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a business-logic stack of one or more sets of business rules associated with the globalization setting is obtained (operation 402). The sets of business rules in the business-logic stack may be based on a locale, organization, and/or category associated with the globalization setting.

Next, the user-interface component is obtained based on an order of the sets of business rules in the business-logic stack. In particular, an attempt to obtain a variant of the user-interface component associated with a set of business rules in the business-logic stack is made (operation 404). The variant may also be associated with a language from a language stack for the application. For example, the variant may include a custom layout for a language and/or region, which may be obtained from the globalization setting and/or a locale setting for an electronic device on which the application executes.

The user-interface component may then be obtained based on the availability of the variant (operation 406). If the variant is available, the variant is included in a set of user-interface components (operation 412) to be used in the application. If the variant is not available, variants associated with remaining sets of business rules in the business-logic stack (operation 408) may be used.

If additional sets of business rules remain in the business-logic stack, an attempt to obtain a variant of the user-interface component associated with the next-lowest set of business rules in the business-logic stack is made (operation 404). The availability of the variant (operation 406) may result in the inclusion of the variant in the set of user-interface components (operation 412) or a continuation of the search for an available variant with remaining sets of business rules in the business-logic stack (operations 408 and 404). If no sets of business rules remain in the business-logic stack (e.g., if the bottom of the business-logic stack is reached), the basic version of the user-interface component is included in the set of user-interface components (operation 410). The basic version may lack any customizations that are related to business rules in the business-logic stack or languages in the language stack.

Figure 5:
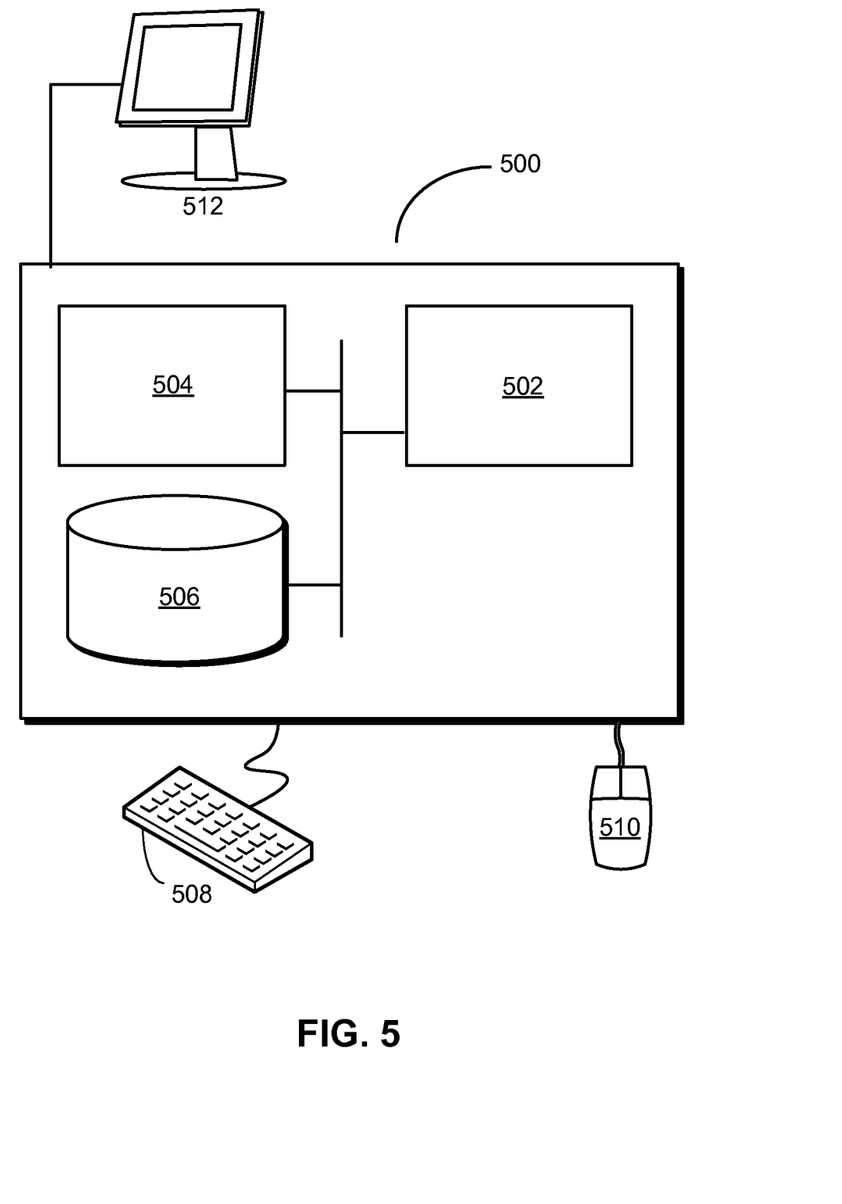
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating use of an application. The system may include a language-management apparatus that obtains a language stack containing an ordered set of preferred languages for a user of the application. The system may also include a localization apparatus. For each user-interface component from a set of user-interface components in the application, the localization apparatus may obtain content for the user-interface component based on an order of languages in the language stack and include the content in the user-interface component during use of the application by the user. Finally, the system may include an internationalization apparatus that obtains the set of user-interface components based on a globalization setting for the application.

In addition, one or more components of computer system 500 may be remotely located and connected to the other components over a network. Portions of the present embodiments (e.g., language-management apparatus, localization apparatus, internationalization apparatus, etc.) may also be located on different nodes of a distributed system that implements the embodiments. For example, the present embodiments may be implemented using a cloud computing system that provides localization and internationalization of an application to a set of remote electronic devices on which the application is installed.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of an application executing on an electronic device, comprising:
   detecting a change in a locale setting of the application;
   upon detecting the change in the locale setting, identifying one or more languages associated with the locale setting;
   obtaining a language stack comprising an ordered set of preferred languages for a user of the application;
   adding the identified one or more languages to the language stack;
   obtaining a business-logic stack that includes one or more sets of business rules corresponding to one or more tax codes associated with a specified globalization setting for the application, wherein the specified globalization setting comprises at least one of: a city; a state; a country; an organization; and a category; and
   for each user-interface component from a set of user-interface components in the application, wherein the set of user-interface components is created by a localization mechanism associated with a platform of the electronic device:
      dynamically obtaining content for the user-interface component from a content-repository based on an order of languages in the language stack and on an order of the one or more sets of business rules in the business-logic stack, wherein the content-repository is a store of language-specific and tax-code-specific content for the user-interface components associated with the application; and
      including, via the localization mechanism associated with the platform of the electronic device, the content in the user-interface component during use of the application on the electronic device by the user.

2. The computer-implemented method of claim 1, further comprising:
   obtaining the set of user-interface components based on the globalization setting for the application.

3. The computer-implemented method of claim 1, wherein dynamically obtaining content for the user-interface component from a content-repository based on an order of languages in the language stack and on an order of the one or more sets of business rules in the business-logic stack comprises:
   attempting to obtain a first variant of the user-interface component associated with a first set of business rules in the business-logic stack;
   if the first variant is available, including the first variant in the set of user-interface components; and
   if the first variant is not available, attempting to obtain a second variant of the user-interface component associated with a second set of business rules following the first set of business rules in the business-logic stack.

4. The computer-implemented method of claim 1, wherein obtaining the language stack comprises:
   including a default language at a bottom of the language stack; and
   adding one or more languages to the language stack based on at least one of a locale setting associated with the electronic device and the globalization setting.

5. The computer-implemented method of claim 1, wherein obtaining content for the user-interface component based on the order of languages in the language stack involves:
   attempting to obtain content for the user-interface component in a first language in the ordered set;
   if the content is available in the first language, using the content with the user-interface component; and
   if the content is not available in the first language, attempting to obtain the content in a second language following the first language in the ordered set.

6. The computer-implemented method of claim 1, wherein the user-interface component comprises at least one of a string, a graphical object, a display setting, and a file.

7. A system for facilitating use of an application executing on an electronic device, comprising:
   a language-management apparatus configured to:
      detect a change in a locale setting of the application;
      identify one or more languages associated with the locale setting upon detecting the change in the locale setting;
      obtain a language stack comprising an ordered set of preferred languages for a user of the application; and
      add the identified one or more languages to the language stack;
   an internationalization apparatus configured to:
      obtain a business-logic stack that includes one or more sets of business rules corresponding to one or more tax codes associated with a specified globalization setting for the application, wherein the specified globalization setting comprises at least one of: a city; a state; a country; an organization; and a category; and
   a localization apparatus configured to:
      for each user-interface component from a set of user-interface components in the application, wherein the set of user-interface components is created by the localization apparatus:
         dynamically obtain content for the user-interface component from a content-repository based on an order of languages in the language stack and on an order of the one or more sets of business rules in the business-logic stack, wherein the content-repository is a store of language-specific and tax-code-specific content for the user-interface components associated with the application; and
         include the content in the user-interface component during use of the application on an electronic device by the user,
      wherein the localization apparatus is associated with a platform of the electronic device.

8. The system of claim 7, wherein the internationalization apparatus is further configured to obtain the set of user-interface components based on the globalization setting for the application.

9. The system of claim 7, wherein obtaining the language stack comprises:

including a default language at a bottom of the language stack; and adding one or more languages to the language stack based on at least one of a locale setting associated with the electronic device and the globalization setting.

10. The system of claim 7, wherein obtaining content for the user-interface component based on the order of languages in the language stack involves:

attempting to obtain content for the user-interface component in a first language in the ordered set;

if the content is available in the first language, using the content with the user-interface component; and if the content is not available in the first language, attempting to obtain the content in a second language following the first language in the ordered set.

11. The system of claim 7, wherein the user-interface component comprises at least one of a string, a graphical object, a display setting, and a file.

12. A non-transitory computer-readable storage medium storing instructions that when executed by a computer cause the computer to perform a method for facilitating use of an application executing on an electronic device, the method comprising:

detecting a change in a locale setting of the application;

upon detecting the change in the locale setting, identifying one or more languages associated with the locale setting;

obtaining a language stack comprising an ordered set of preferred languages for a user of the application;

adding the identified one or more languages to the language stack;

obtaining a business-logic stack that includes one or more sets of business rules corresponding to one or more tax codes associated with a specified globalization setting for the application, wherein the specified globalization setting comprises at least one of: a city; a state; a country; an organization; and a category; and for each user-interface component from a set of user-interface components in the application, wherein the set of user-interface components is created by a localization mechanism associated with a platform of the electronic device:

dynamically obtaining content for the user-interface component from a content-repository based on an order of languages in the language stack and on an order of the one or more sets of business rules in the business-logic stack, wherein the content-repository is a store of language-specific and tax-code-specific content for the user-interface components associated with the application; and including, via the localization mechanism associated with the platform of the electronic device, the content in the user-interface component during use of the application on the electronic device by the user.

13. The non-transitory computer-readable storage medium of claim 12, the method further comprising:

obtaining the set of user-interface components based on the globalization setting for the application.

14. The non-transitory computer-readable storage medium of claim 12, wherein obtaining the language stack comprises:

including a default language at a bottom of the language stack; and adding one or more languages to the language stack based on at least one of a locale setting associated with the electronic device and a globalization setting associated with the application.

15. The non-transitory computer-readable storage medium of claim 12, wherein obtaining content for the user-interface component based on the order of languages in the language stack involves:

attempting to obtain content for the user-interface component in a first language in the ordered set;

if the content is available in the first language, using the content with the user-interface component; and if the content is not available in the first language, attempting to obtain the content in a second language following the first language in the ordered set.

16. The non-transitory computer-readable storage medium of claim 12, wherein the user-interface component comprises at least one of a string, a graphical object, a display setting, and a file.

* * * * *